United States Patent
Chavez et al.

(10) Patent No.: US 11,588,515 B2
(45) Date of Patent: Feb. 21, 2023

(54) FAST LOCAL OSCILLATOR TUNING TRANSMITTER

(71) Applicant: Rockwell Collins, Inc., Cedar Rapids, IA (US)

(72) Inventors: Carlos J. Chavez, Marion, IA (US); Sasha Oster, Marion, IA (US); Vadim Olen, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 63 days.

(21) Appl. No.: 17/232,757

(22) Filed: Apr. 16, 2021

(65) Prior Publication Data

US 2021/0328620 A1     Oct. 21, 2021

Related U.S. Application Data

(60) Provisional application No. 63/011,802, filed on Apr. 17, 2020.

(51) Int. Cl.
*H04B 1/692* (2011.01)
*H04B 1/719* (2011.01)
(Continued)

(52) U.S. Cl.
CPC .............. *H04B 1/692* (2013.01); *H04B 1/707* (2013.01); *H04B 1/719* (2013.01); *H04B 2001/6904* (2013.01)

(58) Field of Classification Search
CPC ........ H04B 1/692; H04B 1/707; H04B 1/719; H04B 2001/6904; H04B 1/0475; H04B 2001/6908; H04B 1/7163
See application file for complete search history.

(56) References Cited

U.S. PATENT DOCUMENTS 4,179,694 A     12/1979  Alder
5,355,523 A  *  10/1994  Ogawa ................... H04B 1/405
                                                       455/259
(Continued)

FOREIGN PATENT DOCUMENTS

AU      2000078158 A1      4/2001
DE       3901639 A1  *    8/1989
(Continued)

*Primary Examiner* — Sam K Ahn
*Assistant Examiner* — Amneet Singh
(74) *Attorney, Agent, or Firm* — Suiter Swantz pc llo (57) ABSTRACT

A spread-spectrum transmitter is disclosed. The transmitter includes a modulator configured to produce an intermediate frequency signal, a frequency shifter configured to shift the intermediate frequency factor by a first factor, and a local oscillator (LO) configured to generate a LO signal. The transmitter further includes a ramp signal generator configured to determine the value of the first factor and a second factor, is configured to transmit the value of the factor to the frequency shifter, is configured to transmit the value of the second factor to the LO, where the frequency of the intermediate frequency signal shifted by the first factor is shifted synchronously with the frequency of the LO signal shifted by the second factor. The transmitter includes a mixer configured to mix the shifted intermediate frequency with the shifted LO signal that has been shifted by the second factor, producing a spread leaked LO signal.

20 Claims, 5 Drawing Sheets

(51) Int. Cl.
   *H04B 1/707*  (2011.01)
   *H04B 1/69*   (2011.01)

(56) References Cited

U.S. PATENT DOCUMENTS

| | | | |
|---|---|---|---|
| 7,620,095 B2 | 11/2009 | Ben-Bassat | |
| 7,660,338 B2 | 2/2010 | Smith et al. | |
| 8,175,134 B1 * | 5/2012 | Giallorenzi | H04B 1/692 |
| | | | 375/139 |
| 8,405,464 B2 | 3/2013 | Gibson et al. | |
| 2009/0137213 A1 | 5/2009 | Rofougaran et al. | |

FOREIGN PATENT DOCUMENTS

| | | |
|---|---|---|
| EP | 0880827 A1 | 12/1998 |
| GB | 1592780 A | 7/1981 |
| WO | 2007146520 A2 | 12/2007 |

* cited by examiner

FAST LOCAL OSCILLATOR TUNING TRANSMITTER

PRIORITY

The present application claims the benefit under 35 U.S.C. § 119(e) of U.S. Provisional App. No. 63/011,802 (filed Apr. 17, 2020), which is incorporated herein by reference in its entirety.

BACKGROUND

Spread spectrum techniques are commonly used in radio communications, whereby data signals intended for transmission are initially code-modulated by a modulator. This code modulation increases the bandwidth that the data occupies. When the transmitted code-modulated data is received by a receiver, the modulation is removed and the original data signals are restored.

In preparing the data signal for transmission, the code-modulated signal exists initially as an intermediate frequency (IF) signal that is then mixed with a local oscillator signal to produce an RF signal that is then amplified and transmitted. Local oscillators commonly leak energy, which then may be inadvertently amplified and transmitted along with the RF signal. The transmitted signal from the local oscillator is problematic to radio systems that are designed for minimizing the probability of detection, as the local oscillator signal may potentially be detected by an adversary. Methods to reduce local oscillator energy leakage (e.g., such as through a double-conversion filtering architecture) are often expensive and increase power consumption while increasing size. Therefore, it is desirable to provide a system that avoids the shortcomings of conventional approaches.

SUMMARY

A spread spectrum transmitter is disclosed. In some embodiments, the spread spectrum transmitter includes a modulator. In one or more embodiments, the modulator is configured to receive a data signal. In one or more embodiments, the modulator is further configured to receive a coding signal. In one or more embodiments, the modulator is further configured to combine the data signal with the coding, producing an intermediate frequency signal. In some embodiments, the spread spectrum transmitter further includes a frequency shifter configured to shift the intermediate frequency signal by a first factor. In some embodiments, the spread spectrum transmitter further includes a local oscillator configured to generate a local oscillator signal. In some embodiments, the spread spectrum transmitter includes a ramp signal generator. In some embodiments, the ramp signal generator is configured to determine a value of the first factor. In some embodiments, the ramp signal generator is configured to determine a value of a second factor. In some embodiments, the ramp signal generator is configured to transmit the value of the first factor to the frequency shifter. In some embodiments, the ramp signal generator is configured to transmit the value of the second factor to the local oscillator, wherein the frequency of the intermediate frequency signal shifted by the first factor is shifted synchronously with the frequency of the local oscillator signal shifted by the second factor. In some embodiments, the spread spectrum transmitter further includes a mixer configured to mix the intermediate frequency signal that has been shifted by the first factor with the local oscillator signal that has been shifted by the second factor, wherein a leaked local oscillator signal is frequency-spread;

In some embodiments, the spread spectrum transmitter further includes an amplifier. In some embodiments, the spread spectrum transmitter further includes an antenna.

In some embodiments of the spread spectrum transmitter, the spread spectrum transmitter is configured to utilize direct-sequence modulation.

In some embodiments of the spread spectrum transmitter, the spread spectrum transmitter is configured to employ code division multiple access methods.

In some embodiments of the spread spectrum transmitter, the spread spectrum transmitter is configured to employ frequency hopping.

In some embodiments of the spread spectrum transmitter, the spread spectrum transmitter further includes a digital-to-analog converter configured to convert the intermediate frequency signal from the frequency shifter into an analog signal.

In some embodiments of the spread spectrum transmitter, the mixer is configured as an analog RF multiplier.

In some embodiments of the spread spectrum transmitter, the spread spectrum transmitter further comprises one or more filters.

In some embodiments of the spread spectrum transmitter, the values of the first factor and the second factor are ramped.

In some embodiments of the spread spectrum transmitter, the values of the first factor and the second factor are ramped linearly.

In some embodiments of the spread spectrum transmitter, the values of the first factor and the second factor are ramped exponentially.

In some embodiments of the spread spectrum transmitter, the values of the first factor and the second factor are ramped corresponding to a frequency hopping procedure.

In some embodiments of the spread spectrum transmitter, the frequency of the intermediate frequency signal and the frequency of the local oscillator signal are shifted in opposite directions.

In some embodiments of the spread spectrum transmitter, wherein the frequency of the intermediate frequency signal and the frequency of the local oscillator signal are shifted equally in opposite directions.

In some embodiments of the spread spectrum transmitter, the local oscillator is configured as a voltage-controlled oscillator, wherein the voltage-controlled oscillator receives a voltage from the ramp signal generator.

In some embodiments of the spread spectrum transmitter, the local oscillator comprises a numerically controlled oscillator.

In some embodiments of the spread spectrum transmitter, the local oscillator is configured as a numerically-controlled oscillator.

A system is also disclosed. In one or more embodiments, the system includes a spread spectrum transmitter. In some embodiments, the spread spectrum transmitter includes a modulator. In one or more embodiments, the modulator is configured to receive a data signal. In one or more embodiments, the modulator is further configured to receive a coding signal. In one or more embodiments, the modulator is further configured to combine the data signal with the coding, producing an intermediate frequency signal. In some embodiments, the spread spectrum transmitter further includes a frequency shifter configured to shift the intermediate frequency signal by a first factor. In some embodiments, the spread spectrum transmitter further includes a local oscillator configured to generate a local oscillator signal. In some embodiments, the spread spectrum transmitter includes a ramp signal generator. In some embodiments, the ramp signal generator is configured to determine a value of the first factor. In some embodiments, the ramp signal generator is configured to determine a value of a second factor. In some embodiments, the ramp signal generator is configured to transmit the value of the first factor to the frequency shifter. In some embodiments, the ramp signal generator is configured to transmit the value of the second factor to the local oscillator, wherein the frequency of the intermediate frequency signal shifted by the first factor is shifted synchronously with the frequency of the local oscillator signal shifted by the second factor. In some embodiments, the spread spectrum transmitter further includes a mixer configured to mix the intermediate frequency signal that has been shifted by the first factor with the local oscillator signal that has been shifted by the second factor, wherein a leaked local oscillator signal is frequency-spread. In some embodiments, the spread spectrum transmitter further includes an amplifier. In some embodiments, the spread spectrum transmitter further includes an antenna.

In some embodiments of the system, the spread spectrum transmitter is configured to utilize direct-sequence modulation.

In some embodiments of the system, the spread spectrum transmitter is configured to employ code division multiple access methods.

In some embodiments of the system, the spread spectrum transmitter is configured to employ frequency hopping.

In some embodiments of the system, the system further comprised a receiver.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, embodiments of the inventive concepts described herein are directed to a fast local oscillating transmitter. More particularly, embodiments of the inventive concepts disclosed herein are directed to a transmitter used in spread spectrum applications capable of shifting the frequency of an intermediate frequency (IF) signal synchronously with shifting the frequency of a local oscillator.

Figure 1:
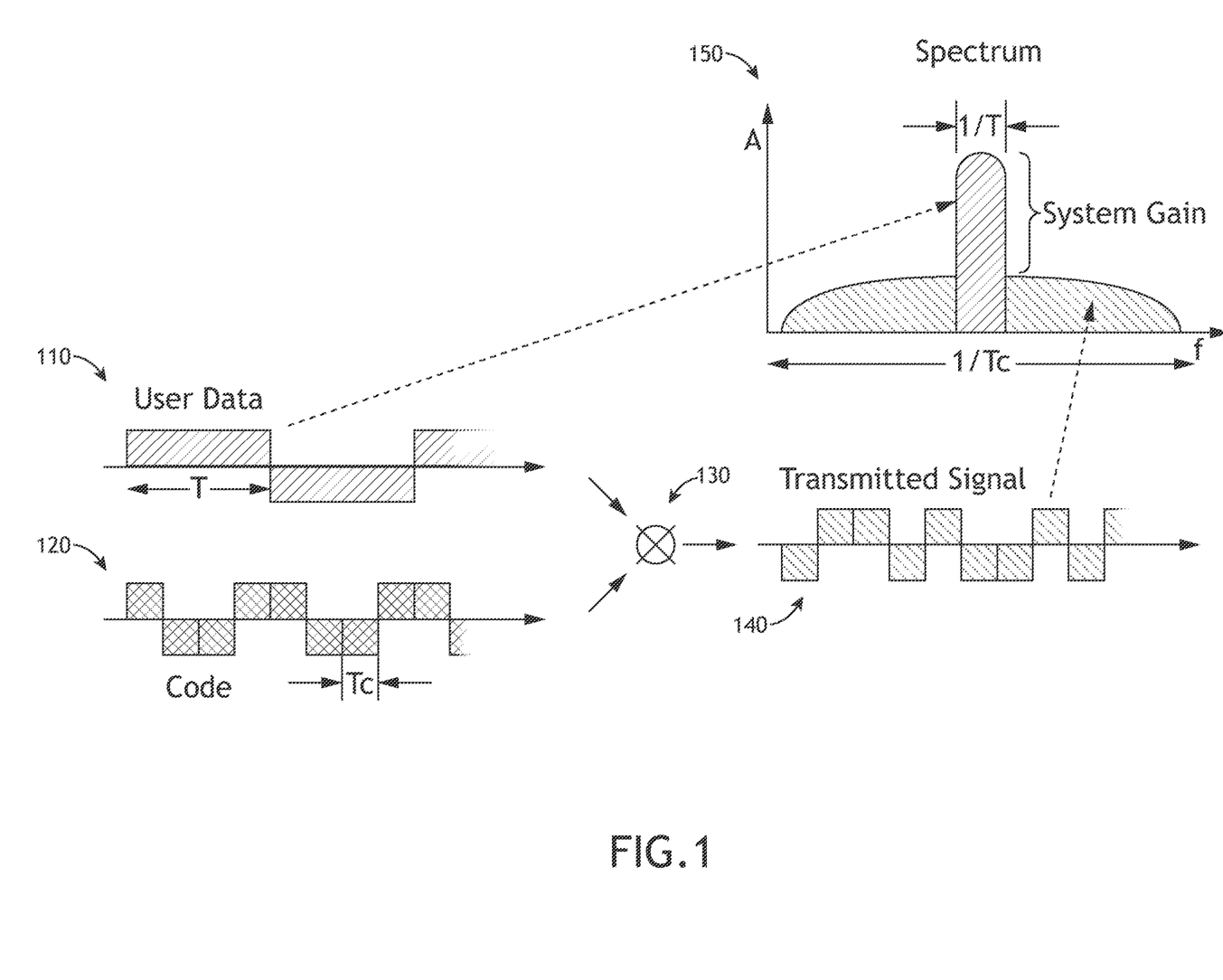
FIG. 1 is a diagram illustrating the inputs and output of a spread spectrum signal modulator, in accordance with one or more embodiments of the disclosure.

Spread Spectrum refers to a system designed to provide secure communications by spreading a transmitted signal over a large frequency band. FIG. 1 is a diagram that illustrating the inputs and output of a spread spectrum signal modulator, in accordance with one or more embodiments of the disclosure. In spread spectrum, the data signal 110 and a coding signal 120 are mixed 130, forming a spread signal 140. Once transmitted, the spread signal 140 has a bandwidth (e.g., roughly $1/T_c$) considerably wider than the bandwidth of the original data signal, $1/T$ (e.g., as shown in the graph 150). Upon reception, the signal de-spread, and the original message is recovered. Spread spectrum signals are more difficult to jam and offer better low probability of detection (LPD) performance.

Figure 2:
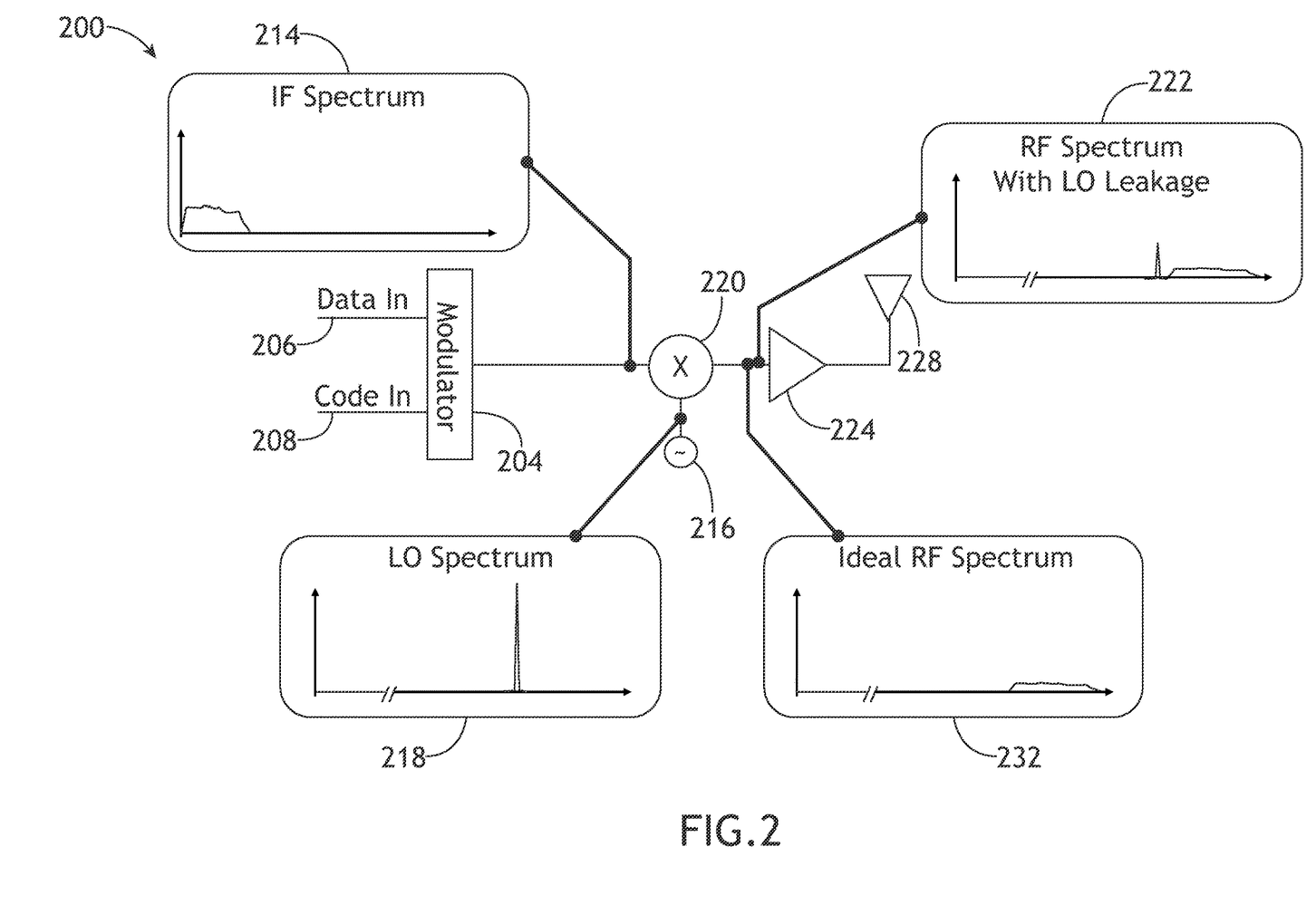
FIG. 2 is a schematic illustration of a spread spectrum transmitter, in accordance with one or more embodiments of the disclosure.

FIG. 2 is a schematic illustration of a spread spectrum transmitter 200, in accordance with one or more embodiments of the disclosure. The spread spectrum transmitter 200 may be configured to utilize any spread spectrum modulation methods used in the art including but not limited to direct-sequence spread spectrum methods, frequency-hopping spread spectrum method, time-hopping spread spectrum methods, and chirp-spread methods. For example, the spread spectrum transmitter 200 may be configured to utilize direct-sequence spectrum spread methods in a covert environment.

The spread spectrum transmitter 200 may operate under one or more channel access methods. Channel access methods allow more than two transmitters to transmit over the same wireless channel. The channel access methods used by the spread spectrum transmitter my be any channel access method known in the art including but not limited to frequency-division multiple access, time division multiple access, and code division multiple access. For example, in some embodiments the spread spectrum transmitter may employ code-division multiple access (e.g., code-division multiplexing), wherein where several transmitters can send information simultaneously over a single communication channel. In another example, the spread spectrum transmitter may further operate under one or more frequency hopping methods, where the channel frequency is changed rapidly according to a sequence that constitutes the spreading code.

In some embodiments, the spread spectrum transmitter 200 includes a modulator 204 (e.g., a modem). The modulator 204 is configured to receive a data signal and a coding signal, and combine the data signal 206 and the coding signal 208, to produce a spread-spectrum IF signal 214 (e.g., represented by an IF signal spectrum). The modulator may be any modulator known in the art for combining a data signal with a coding signal.

In some embodiments, the spread spectrum transmitter 200 further includes a local oscillator 216. The local oscillator 216 produces a local oscillator signal 218 (e.g., represented by a local oscillator signal spectrum) that is intended to be mixed with the IF signal 214 (e.g., as part of a heterodyning method). The local oscillator may be a local oscillator known in the art including but not limited to a variable frequency oscillator, a frequency synthesizer, a voltage-controlled oscillator, or a numerically controlled oscillator.

In some embodiments, the spread spectrum transmitter 200 further includes a mixer 220. The mixer 220 is an electrical circuit that mixes the IF signal 214 with the local oscillator signal 218 to produce an RF signal 222 (e.g., represented by an RF signal spectrum). The mixer 220 may be any type of mixer known in the art including but not limited to a single unbalanced mixer, a diode, a transistor, or analog multiplier. For example, in some embodiments, the mixer is an analog RF multiplier. For instance, the mixer 220 may be an analog RF multiplier that is voltage-controlled.

In some embodiments, the spread spectrum transmitter 200 includes an amplifier 224. The amplifier is an electronic circuit that can increase the power of the RF signal 222. In some embodiments, the spread spectrum transmitter further includes an antenna 228.

The mixing of the IF signal 214 with the local oscillator signal 218 shifts the frequency of the IF signal 214 to a frequency equal to the sum of the intermediate frequency and the local oscillator frequency. Under ideal conditions, the mixing of the IF signal 214 with the local oscillator signal 218 removes all of the original local oscillator signal 218, resulting in an idealized RF signal 232 that is free of any local oscillator signal 218. However, some portion of the local oscillator signal 218 typically remains within the RF signal 222 (e.g., indicated by the short singular spike in the graph). The remnant local oscillator signal may be detectable by an adversary, allowing the adversary to determine the location of the transmitter, perceive that a transmission is taking place, and may assist the adversary in determining and receiving the spread spectrum signal. The presence of local oscillator signal 218 in the RF signal 222 (e.g., also referred to as local oscillator leakage) occurs when the local oscillator signal leaks to components of the transmitter other than the mixer 220. These extraneous signals are eventual combined with the spread spectrum signal, where it is amplified and transmitted. Methods to reduce the presence of leaked local oscillator signal in the RF signal through filtering has been proposed. However, the extra steps for filtering out the extraneous local oscillator signal adds cost, size, and power consumption to the transmitter.

Figure 3:
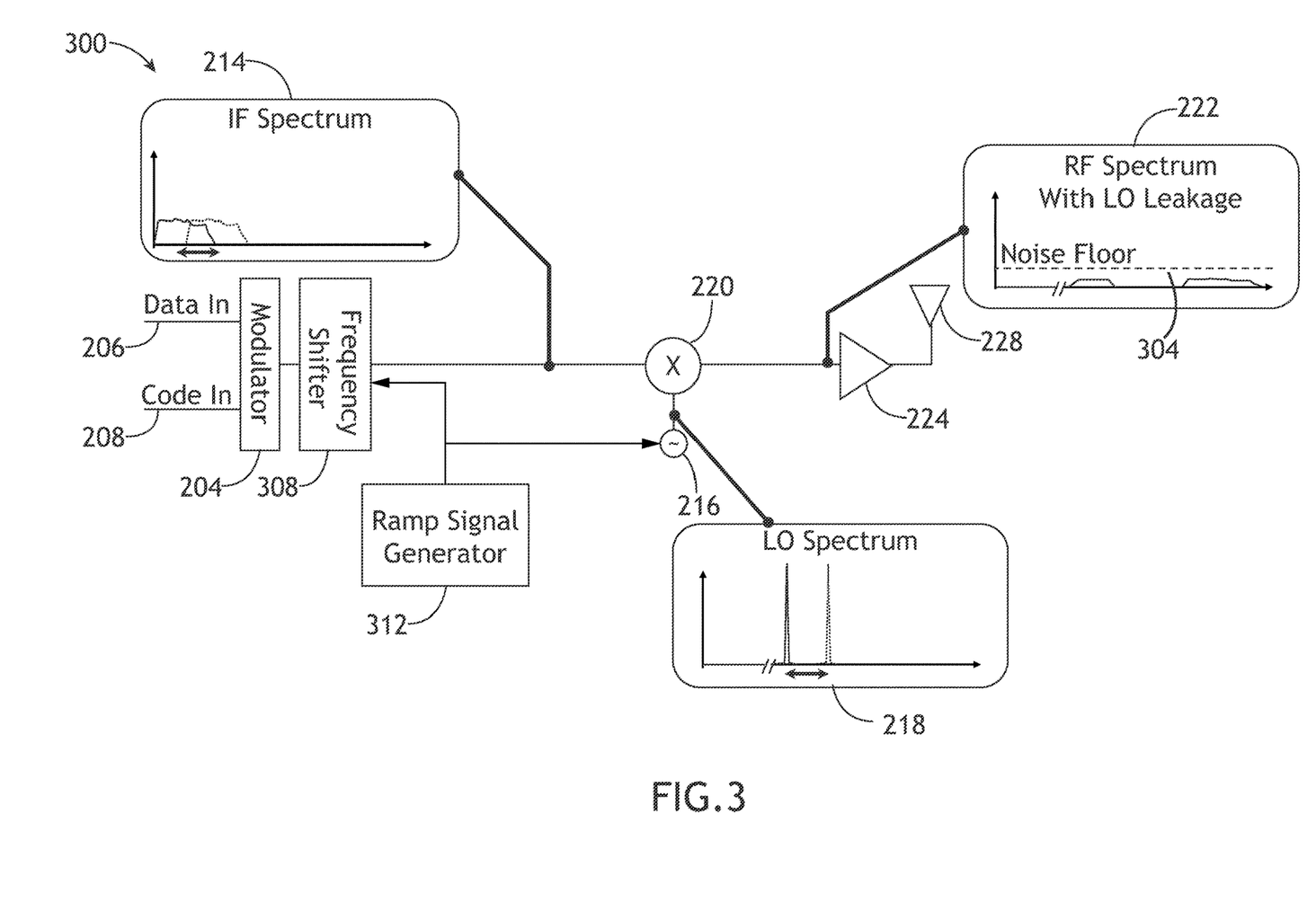
FIG. 3 is a schematic illustration of the spread spectrum transmitter configured to shift the frequency of the IF signal by a first factor synchronously with the frequency of the local oscillator signal that is shifted by a second factor, in accordance with one or more embodiments of the disclosure.

FIG. 3 is a schematic illustration of a spread spectrum transmitter 300 configured to shift the frequency of the IF signal 228 by a first factor synchronously with the frequency shift of the local oscillator signal 244 that is shifted by a second factor, in accordance with one or more embodiments of the disclosure. The spread spectrum transmitter 300 may include or more, or all, components of the spread spectrum transmitter 200, and vice versa. By shifting both the IF signal and the local oscillator signal before mixing by the mixer 220, an RF signal 222 may be produced that will be shifted to the same degree as it would have been without the synchronized shift, and any local oscillator signal 218 that leaks into the RF signal 222 will be spread and reduced in signal strength. Thus, the local oscillator leakage is reduced in strength through this power- and cost-effective step (e.g., to below the noise floor 304).

In some embodiments, the spread spectrum transmitter 300 further includes a frequency shifter 308. The frequency shifter 308 shifts the frequency of the IF signal so that the shifted IF frequency is synchronized with the frequency of the local oscillator signal (e.g., the frequencies of the IF signal 214 and the frequency of the local oscillator signal 232 are shifted at the same time). The frequency shifter 308 may be any electrical circuit or component that is capable of shifting a spread spectrum signal including but not limited to a mixer or a multiplier. In some embodiments, the signal shifted by the frequency shifter 308 is a digital signal. In some embodiments, the signal shifted by the frequency shifter is an analog signal.

In some embodiments of the disclosure, the spread spectrum transmitter 300 further includes a ramp signal generator 312. The ramp signal generator 312 transmits signals (e.g., a ramp signal) to the local oscillator 216 and to the frequency shifter 308 to coordinate a synchronized shift of the IF signal 214 and the local oscillator signal 232. The ramp signal generator 312 may include any components configured to deliver a synchronization signal. For example, the ramp signal generator 312 may include a circuit that delivers a digital synchronizing signal to both the frequency shifter 308 and a numerically controlled oscillator acting as the local oscillator 216, instructing both components to produce a synchronized shift in the IF signal 213 and local oscillator signal 218, respectively.

The ramp signal generator 312 may include any circuitry, electrical component, or processor capable of creating and/or sending a signal to the frequency shifter 308 and the local oscillator 216 including but not limited to a field programmable gate array (FPGA), an application specific integrated circuit (ASIC). Therefore, the ramp signal generator is not limited by the materials from which it is formed or the processing mechanisms employed therein and, as such, can be implemented via semiconductor(s) and/or transistors (e.g., using electronic integrated circuit (IC) components), and so forth.

In another example, the ramp signal generator 312 may deliver a synchronizing signal to the frequency shifter 308. A variable voltage output could control the local oscillator 216 (e.g., a voltage-controlled oscillator (VCO). A VCO is an oscillator with an output signal whose output can be varied over a range, which is controlled by the input DC voltage (e.g., the output frequency varied directly to the voltage of the input). In this example, the digital signal received by the frequency shifter 308 and the analog voltage-varying signal received by the VCO results in a synchronized shift in the IF signal 213 and the local oscillator signal. In another example, the local oscillator is controlled by a VCO that is incorporated into the ramp signal generator 312. Many combinations of electrical circuits and electrical components are possible in creating a ramp signal generator that can produce signals that result in a synchronized shift in the IF signal 213 and local oscillator signal 218. Therefore, the above description should not be interpreted as a limitation of the present disclosure, but merely an illustration.

The shifting of the IF signal 214 by the first factor and the local oscillator signal 218 by the second factor before mixing by the mixer 220 must be carefully coordinated. Typically, the first factor and the second factor are intended to shift the signals in equal and opposite directions. For example, the frequency shifter 308 may be instructed by the ramp signal generator 312 to shift the frequency of the IF signal 214 down 50 MHz, while the local oscillator may be instructed by the ramp signal generator 312 to shift the frequency of the local operator signal 218 up 50 MHz After mixing by the mixer 220, the IF signal will be shifted back to the original frequency band as the RF signal 222, while any leaked local oscillator signal will be spread, with peaks of lowering amplitude. It should be noted that the first factor and the second factor may be intended not to shift the signals in equal and opposite directions. For example, the first factor and second factor may be intended to shift the signals in equal directions (e.g., shifting both signals up 50 MHz) In another example, the first factor and second factor may be intended to shift the signals in non-equal directions (e.g., the IF signal 214 is shifted down 25 MHz, and the local oscillator signal 218 is shifted up 60 MHz). Differing values for the first factor and second factor may be desirable in order to effectively spread the local oscillator signal 218. Therefore, the above description should not be considered as a limitation to the present disclosure, but merely an illustration.

In some embodiments, the values of the first factor and the second factors are ramped. For example, spread spectrum transmitters 300 utilizing ramped factor values may transmit signals with varying frequency that are received by receivers that can then properly recognize and decode the signal. In some embodiments, the values of the first factor and the second factor are ramped linearly. For example, the factors may be ramped so that the resulting RF signal periodically varies between 350 and 375 MHz. In some embodiments, the values of the first factor and the second factor are ramped exponentially. In some embodiments, the valued of the first factor or second factor are ramped corresponding to a frequency hopping procedure. If the frequency shifter 308 and the local oscillator 216 of the spread spectrum transmitter 300 are synchronized, then the receiver requires no knowledge of the transmitter local oscillator scheme to receive and decode the signal. However, the if the frequency shifter 308 and the local oscillator 216 are not synchronized, the ramp signal generator 312 may generate values for the first factor and the second factor based on a look-up table. After transmission, the receiver, also utilizing the look-up table, would then be able to properly receive and decode the transmission.

Figure 4:
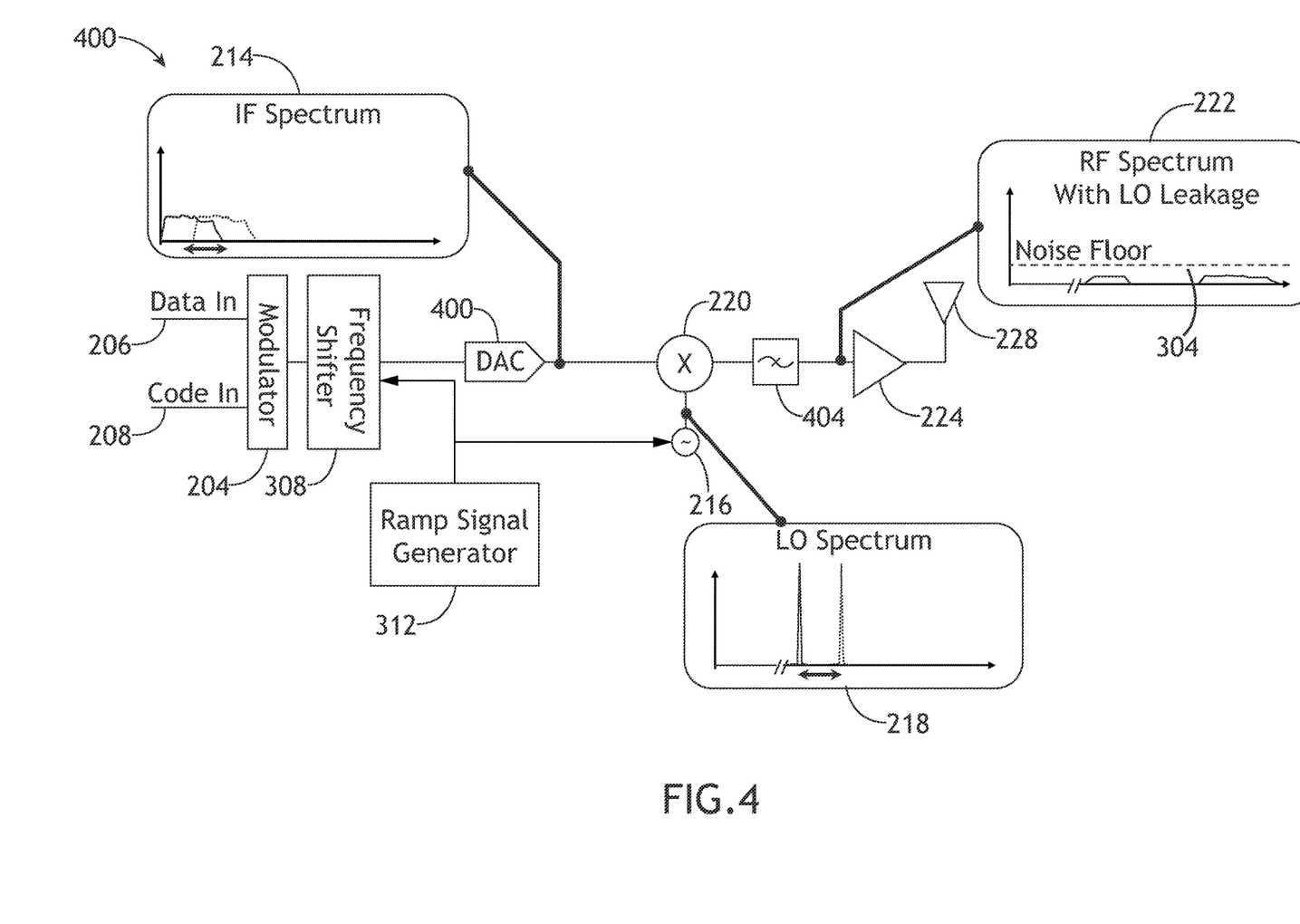
FIG. 4 is a schematic illustration of the spread spectrum transmitter configured to shift the frequency of the IF signal synchronously with the frequency shift of the local oscillator signal, in accordance with one or more embodiments of the disclosure. In some embodiments.

FIG. 4 is a schematic illustration of a spread spectrum transmitter 400 configured to shift the frequency of the IF signal 228 synchronously with the frequency shift of the local oscillator signal 244, in accordance with one or more embodiments of the disclosure. The spread spectrum transmitter 400 may contain one or more, or all, components of spread spectrum transmitter 200,300, and vice versa. In some embodiments, the spread spectrum transmitter 400 further includes a digital-analog converter, or DAC 402. The DAC 402 coverts the modulated digital signal from the modulator 204 and the frequency shifter 308 into an analog IF signal 228 that can then be mixed with the local oscillator signal 244. The DAC 402 used to convert the signal may be any DAC known in the art including but not limited to a pulse-width modulator, an interpolating DAC, a binary-weighted DAC, a hybrid DAC, and the like. Multiple DACs 402 in different configurations may be utilized within the spread spectrum transmitter 400. Therefore, the above description should not be interpreted as a limitation of the present disclosure, but merely an illustration.

In some embodiments, the spread spectrum transmitter 400 may include one or more filters 404. For example, the filter 404 may be an RF filter configured to reduce the level of local oscillator leakage. For instance, the filter 404 may be configured to filter the local oscillator leakage from the spread spectrum transmitter 400, that had been previously spread through the action of the ramp signal generator 312 and the frequency shifter 308. The type of filter 404 used in the spread spectrum transmitter 400 may be any filter known in the art including but not limited to a lumped-element LC filter, a planar filter, a coaxial filter, a dielectric filter, or a cavity filter. For example, the spread spectrum transmitter 400 may include a planar filter configured to filter out leaked local oscillator signals in the 100 to 200 MHz range. The filter 404 may perform any filtering function known in the art including but not limited to a band-pass filter function, a band-stop filter function, a low pass-filter function, or high-pass filter function. For example, the spread spectrum transmitter may include a band-stop filter 404 designed to filter out the spread leaked local oscillator signal. Multiple filters 404 in different configurations may be utilized within the spread spectrum transmitter 400.

Figure 5:
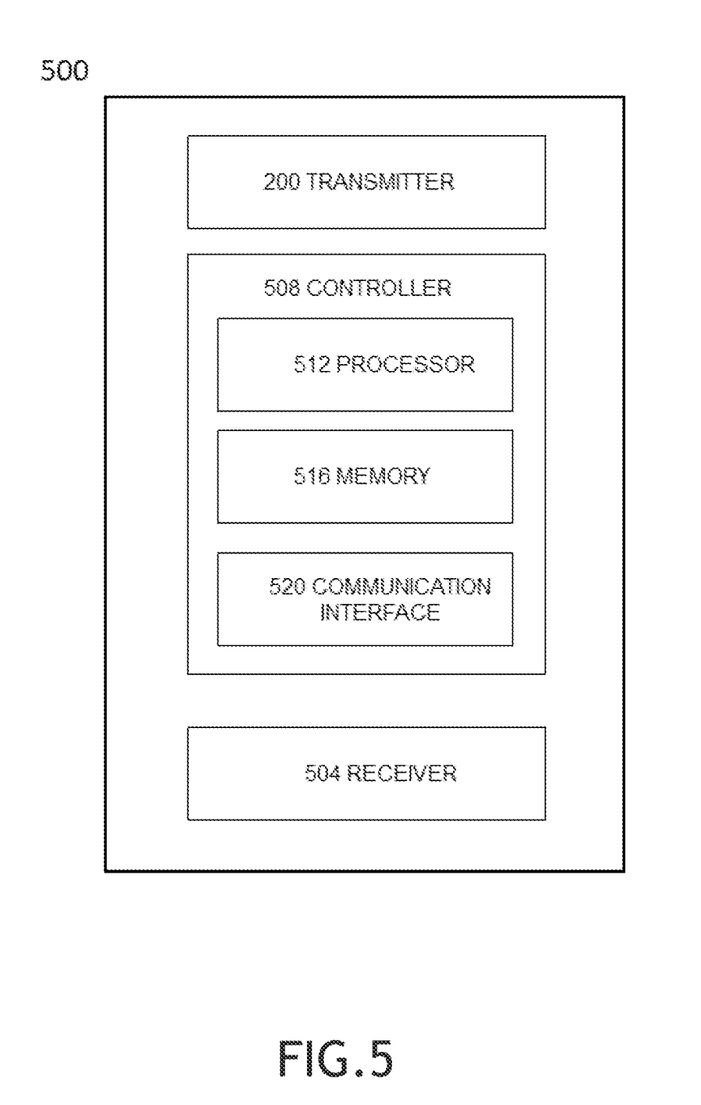
FIG. 5 is a block diagram illustrating a system, in accordance with one or more embodiments of the disclosure.

FIG. 5 is a block diagram illustrating a system 500, in accordance with one or more embodiments of the disclosure. In some embodiments, the system 500 includes any of the transmitters 200,300,400 described herein, a receiver 504, and a controller 508 configured to provide processing functionality for the system 500. For example, the controller 508 may control one or more actions of the modulator 204. The controller 508 may include one or more processors 512 (e.g., micro-controllers, circuitry, field programmable gate array (FPGA) or other processing systems), resident or external memory 516 for storing data, executable code, and other information, and a communication interface 520. The controller 508 can execute one or more software programs embodied in a non-transitory computer readable medium (e.g., memory 516) that implement techniques described herein. The controller 508 is not limited by the materials from which it is formed or the processing mechanisms employed therein and, as such, can be implemented via semiconductor(s) and/or transistors (e.g., using electronic integrated circuit (IC) components), and so forth.

The memory 516 can be an example of tangible, computer-readable storage medium that provides storage functionality to store various data and/or program code associated with operation of the controller 508, such as software programs and/or code segments, or other data to instruct the controller 508, and possibly other components of the system 500, to perform the functionality described herein. Thus, the memory 516 can store data, such as a program of instructions for operating the system 500, including its components (e.g., controller 508, communication interface 520, etc.), and so forth. The memory 516 may also store data derived from the modulator 204. It should be noted that while a single memory 516 is described, a wide variety of types and combinations of memory 516 (e.g., tangible, non-transitory memory) can be employed. The memory 516 can be integral with the controller 508, can comprise stand-alone memory, or can be a combination of both. Some examples of the memory 516 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 520 can be operatively configured to communicate with components of the transmitter 200, 300, 400 and/or the system 500. For example, the communication interface 520 can be configured to retrieve data from the controller 508 or other components, transmit data for storage in the memory 516, retrieve data from storage in the memory 516, and so forth. The communication interface 520 can also be communicatively coupled with the controller 508 to facilitate data transfer between components of the system 500 and the controller 508. It should be noted that while the communication interface 520 is described as a component of the system 500, one or more components of the communication interface 520 can be implemented as external components communicatively coupled to the system 500 via a wired and/or wireless connection. The system 500 can also include and/or connect to one or more input/output (I/O) devices. In embodiments, the communication interface 520 includes or is coupled to a transmitter, receiver, transceiver, physical connection interface, or any combination thereof.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A spread spectrum transmitter, comprising:
    a modulator configured to:
        receive a data signal;
        receive a coding signal; and
        combine the data signal with the coding signal, producing an intermediate frequency signal;
    a frequency shifter configured to shift the intermediate frequency signal by a first factor;
    a local oscillator, configured to generate a local oscillator signal;
    a ramp signal generator, configured to:
        determine a value of the first factor;
        determine a value of a second factor;
        transmit the value of the first factor to the frequency shifter; and
        transmit the value of the second factor to the local oscillator, wherein a frequency of the intermediate frequency signal shifted by the first factor is shifted synchronously with a frequency of the local oscillator signal shifted by the second factor;
    a mixer, configured to mix the intermediate frequency signal that has been shifted by the first factor with the local oscillator signal that has been shifted by the second factor, wherein a leaked local oscillator signal is frequency-spread;
    an amplifier; and
    an antenna.

2. The spread spectrum transmitter of claim 1, wherein the spread spectrum transmitter is configured to utilize direct-sequence modulation.

3. The spread spectrum transmitter of claim 1, wherein the spread spectrum transmitter is configured to employ code division multiple access methods.

4. The spread spectrum transmitter of claim 3, wherein the spread spectrum transmitter is configured to employ frequency hopping.

5. The spread spectrum transmitter of claim 1, further comprising a digital to analog converter configured to convert the intermediate frequency signal from the frequency shifter into an analog signal.

6. The spread spectrum transmitter of claim 1, wherein the mixer is configured as an analog RF multiplier.

7. The spread spectrum transmitter of claim 1, further comprising one or more filters.

8. The spread spectrum transmitter of claim 1, wherein the values of the first factor and the second factor are ramped.

9. The spread spectrum transmitter of claim 7, wherein the values of the first factor and the second factor are ramped at least one of linearly or exponentially.

10. The spread spectrum transmitter of claim 7, wherein the values of the first factor and the second factor are ramped corresponding to a frequency hopping procedure.

11. The spread spectrum transmitter of claim 1, wherein the frequency of the intermediate frequency signal and the frequency of the local oscillator signal are shifted in opposite directions.

12. The spread spectrum transmitter of claim 1, wherein the frequency of the intermediate frequency signal and the frequency of the local oscillator signal are shifted equally in opposite directions.

13. The spread spectrum transmitter of claim 1, where the local oscillator is configured as a voltage-controlled oscillator, wherein the voltage-controlled oscillator receives a voltage from the ramp signal generator.

14. The spread spectrum transmitter of claim 1, wherein the local oscillator comprises a numerically controlled oscillator.

15. The spread spectrum transmitter of claim 1, wherein the local oscillator is configured as a numerically controlled oscillator.

16. A system comprising:
a spread spectrum transmitter, comprising:
a modulator configured to:
receive a data signal;
receive a coding signal; and
combine the data signal with the coding signal, producing an intermediate frequency signal;
a frequency shifter configured to shift the intermediate frequency signal by a first factor;
a local oscillator, configured to generate a local oscillator signal;
a ramp signal generator, configured to:
determine a value of the first factor;
determine a value of a second factor;
transmit the value of the first factor to the frequency shifter; and
transmit the value of the second factor to the local oscillator, wherein a frequency of the intermediate frequency signal shifted by the first factor is shifted synchronously with a frequency of the local oscillator signal shifted by the second factor;
a mixer, configured to mix the intermediate frequency signal that has been shifted by the first factor with the local oscillator signal that has been shifted by the second factor, wherein a leaked local oscillator signal is frequency-spread;
an amplifier; and
an antenna; and
a controller configured to control one or more actions of the modulator.

17. The system of claim 16, further comprising a receiver.

18. The system of claim 16, wherein the spread spectrum transmitter is configured to utilize direct-sequence modulation.

19. The system of claim 16, wherein the spread spectrum transmitter is configured to employ code division multiple access methods.

20. The system of claim 16, wherein the spread spectrum transmitter is configured to employ frequency hopping.

* * * * *